US012776683B2

(12) United States Patent
Castor

(10) Patent No.: US 12,776,683 B2
(45) Date of Patent: Oct. 27, 2026

(54) WIND MODULE PANEL SYSTEMS FOR RENEWABLE WIND ENERGY USING A PLURALITY OF OSCILLATING LEAVES TO DRIVE MICROGENERATORS

(71) Applicant: Mack Research Corp., Pasadena, CA (US)

(72) Inventor: Casey Mack Castor, Pasadena, CA (US)

(73) Assignee: Mack Research Corp., Pasadena, CA (US)

( * ) Notice: Subject to any disclaimer, the term of this patent is extended or adjusted under 35 U.S.C. 154(b) by 0 days.

(21) Appl. No.: 18/821,622

(22) Filed: Aug. 30, 2024

(65) Prior Publication Data

US 2025/0079937 A1 Mar. 6, 2025

Related U.S. Application Data

(60) Provisional application No. 63/536,117, filed on Sep. 1, 2023.

(51) Int. Cl.
*H02K 7/18* (2006.01)
*F03D 15/00* (2016.01)
(Continued)

(52) U.S. Cl.
CPC .......... *H02K 7/1892* (2013.01); *F03D 15/00* (2016.05); *H02J 7/14* (2013.01); *H02K 7/116* (2013.01);
(Continued)

(58) Field of Classification Search
None
See application file for complete search history.

(56) References Cited

U.S. PATENT DOCUMENTS 3,895,236 A * 7/1975 Herron .................... F03G 7/00 290/55
4,184,805 A * 1/1980 Arnold .................... F03D 5/06 416/64
(Continued)

OTHER PUBLICATIONS

Casey Castor, Leave Module Panel System, Presented to the Faculty of the School of Architecture University of Southern California In partial fulfillment of the Requirements of degree Master of Building Science, Aug. 2019, Los Angeles, CA.

*Primary Examiner* — Tulsidas C Patel
*Assistant Examiner* — S. Mikailoff
(74) *Attorney, Agent, or Firm* — Chong IP Law Group

(57) ABSTRACT

Wind module panel systems for renewable wind energy are provided. In one embodiments, a wind module panel system for generating renewable energy includes a first leaf module comprising: at least one leaf comprising a blade and a stem, wherein the blade receives wind causing the at least one leaf to oscillate; an exterior sheet panel having a slot configured to receive the stem of the at least one leaf, wherein the slot allows the at least one leaf to oscillate along a first axis; and a gear box comprising at least one gear and a microgenerator, wherein the oscillation of the at least one leaf in the first axis causes the at least one gear to rotate to induce electrical current by the microgenerator; and a battery, operatively connected to the at least one first leaf module, wherein the battery stores the electrical current generated by the microgenerator.

14 Claims, 14 Drawing Sheets

(51) Int. Cl.
*H02J 7/14* (2006.01)
*H02K 7/116* (2006.01)

(52) U.S. Cl.
CPC ........ *H02K 7/183* (2013.01); *F05B 2220/706* (2013.01); *F05B 2260/4031* (2013.01)

(56) References Cited

U.S. PATENT DOCUMENTS

2010/0276939 A1* 11/2010 Clynes ...................... F03D 9/11 290/55
2012/0235417 A1* 9/2012 Arntz ........................ F03D 5/00 416/64
2016/0201646 A1* 7/2016 Olsen ........................ F03D 7/00 290/55
2024/0218853 A1* 7/2024 Velayutham .............. F03D 5/06
2025/0079937 A1* 3/2025 Castor .................... H02K 7/183

* cited by examiner

WIND MODULE PANEL SYSTEMS FOR RENEWABLE WIND ENERGY USING A PLURALITY OF OSCILLATING LEAVES TO DRIVE MICROGENERATORS

CROSS-REFERENCE TO RELATED APPLICATION

The current application claims priority to U.S. Provisional Patent Application No. 63/536,117, filed on Sep. 1, 2023, the disclosure of which is incorporated herein by reference.

FIELD OF THE INVENTION

The present disclosure generally relates to renewable energy, and more specifically to wind module panel systems for renewable wind energy.

BACKGROUND

Renewable energy is energy generated from renewable resources that are naturally occurring. Renewable energy may include, but is not limited to, solar energy, wind energy, geothermal energy, hydropower, etc. For example, renewable resources may include sunlight and wind. Typically, renewable sources are constantly replenished, plentiful, and thus sustainable. Generally, renewable energy generation may include utilizing renewable resources for electricity generation. In contrast to energy produced from fossil fuels (e.g., coal, oil and gas, etc.), renewable energy generation creates far lower emissions such as harmful greenhouse gas emissions (e.g., carbon dioxide).

As energy consumption continues to rise, various governing bodies are imposing strict measures to mitigate carbon emissions. For example, entities such as the US Green Building Council offer recognition for practicing green construction practices. US federal and state governments grant tax incentives for utilizing sustainable technology. Further, corporations are adopting business practices to promote a sustainable culture. The economic and social benefits are countless and the "Green" initiative is expected to grow in the future.

SUMMARY OF THE INVENTION

The various embodiments of the present wind module panel systems for renewable wind energy contain several features, no single one of which is solely responsible for their desirable attributes. Without limiting the scope of the present embodiments, their more prominent features will now be discussed below. After considering this discussion, and particularly after reading the section entitled "Detailed Description," one will understand how the features of the present embodiments provide the advantages described here.

One aspect of the present embodiments includes the realization that there are few technologies that allow renewable energy to be produced and directly used in an urban built environment. On-site energy production is typically with solar energy generated on the roof surface of buildings. Thus, energy generation on structures is typically an ancillary function of the building hidden from sight. In various embodiments, the present wind module panel systems may create energy and be an integral part of the aesthetic nature of the structure it resides in.

Another aspect of the present embodiments includes the realization that on-site energy production is dominated by solar energy generation. Homes and buildings make use of roof space for installing solar panels, yet space limitations and aesthetic concerns make energy generation limited. This, in turn, indicates an under-utilization of a building's power generation capabilities. In order to meet growing energy demands, wind module panel systems may be utilized to achieve a net-zero carbon output for existing and new constructions.

A further aspect of the present embodiments includes the realization that when metropolitan centers grow, they tend to do so "upwards." Tall, state-of-the-art buildings continue to pop up in cities around the country. As these urban environments grow, their relative climates change. Larger buildings create gradients in temperatures and pressures, leading to more prominent winds. Although wind-generated power has a prominent footprint in rural areas, the technology has not been well-developed for adaptation in urban environments. The present wind module panel systems can take advantage of urban wind currents to help capture a portion of the clean energy market.

In a first aspect, wind module panel system for generating renewable energy is provided, the system comprising: a first leaf module comprising: at least one leaf comprising a blade and a stem, wherein the blade receives wind causing the at least one leaf to oscillate; an exterior sheet panel having a slot configured to receive the stem of the at least one leaf, wherein the slot allows the at least one leaf to oscillate along a first axis; and a gear box comprising at least one gear and a microgenerator, wherein the oscillation of the at least one leaf in the first axis causes the at least one gear to rotate to induce electrical current by the microgenerator; and a battery, operatively connected to the at least one first leaf module, wherein the battery stores the electrical current generated by the microgenerator In an embodiment of the first aspect, the at least one gear comprises a first gear and a second gear, wherein the first and second gears are intermeshing and having differing tooth counts.

In another embodiment of the first aspect, the at least one leaf rotates along the stem.

In another embodiment of the first aspect, the first leaf module further comprises a linear rail configured to receive a linear carriage, and the linear carriage is connected to the steam of the at least one leaf.

In another embodiment of the first aspect, the linear carriage oscillates along the linear rail when the at least one leaf oscillates along the first axis.

In another embodiment of the first aspect, the first axis is vertical.

In another embodiment of the first aspect, the first leaf module further comprises a torsion spring that facilitates the oscillation of the linear rail and the at least one leaf.

In another embodiment of the first aspect, the torsion spring facilitates the oscillation of the linear rail and the at least one leaf by exerting torque when twisted assisting in a direction reversal at an end of each stroke of the oscillation of the linear rail and the at least one leaf.

In another embodiment of the first aspect, the first leaf module further comprises counter balance that counter balances a weight of the at least one leaf thereby assisting in the oscillation of the at least one leaf along the first axis.

In another embodiment of the first aspect, the first leaf module further comprises a cable pulley and a drive belt.

In another embodiment of the first aspect, the drive belt is connected to the cable pulley, the linear carriage, and the at least one gear.

In another embodiment of the first aspect, the first leaf module further comprises at least one vertical spring that is connected to the linear carriage, wherein the at least one vertical spring facilitates the oscillation of the linear carriage and the at least one leaf.

In another embodiment of the first aspect, the at least one vertical spring facilitates the oscillation of the linear carriage and the at least one leaf by exerting energy after being compressed or extended.

In another embodiment of the first aspect, the wind module panel system further comprises a second leaf module, operatively connected to the battery, wherein the second leaf module comprises: at least one leaf comprising a blade and a stem, wherein the blade receives wind causing the at least one leaf to oscillate; an exterior sheet panel having a slot configured to receive the stem of the at least one leaf, wherein the slot allows the at least one leaf to oscillate along the first axis; and a gear box comprising at least one gear and a microgenerator, wherein the oscillation of the at least one leaf in the first axis causes the at least one gear to rotate to induce electrical current by the microgenerator.

In another embodiment of the first aspect, the wind module panel system further comprises a control panel comprising: a processor operatively connected to the first leaf module and to the second leaf module; and memory storing a program comprising instructions that, when executed by the processor, cause the system to: retrieve the renewable energy generated by the microgenerator of the first leaf module and the microgenerator of the second leaf module; and store the renewable energy generated by the microgenerator of the first leaf module and the microgenerator of the second leaf module in the battery.

In another embodiment of the first aspect, the wind module panel system further comprises a rectifier, and wherein the program comprises further instructions that, when executed by the processor, further cause the system to convert alternating current (AC) into direct current (DC) when storing the renewable energy in the battery.

In another embodiment of the first aspect, the wind module panel system further comprises a power optimizer, and wherein the program comprises further instructions that, when executed by the processor, further cause the system to optimize energy retrieval from the first and second leaf modules.

In another embodiment of the first aspect, the power optimizer is a DC to DC converter that uses maximum power point tracking (MPPT).

In another embodiment of the first aspect, the wind module panel system further comprises an inverter, and wherein the program comprises further instructions that, when executed by the processor, further cause the system to convert DC into AC when accessing the renewable energy stored in the battery.

In another embodiment of the first aspect, the wind module panel system further comprising at least one sensor, and wherein the program comprises further instructions that, when executed by the processor, further cause the system to obtain environmental data using the at least one sensor and update at least one setting of the first and second leaf modules using the environmental data.

DETAILED DESCRIPTION OF THE DRAWINGS

Figure 1:
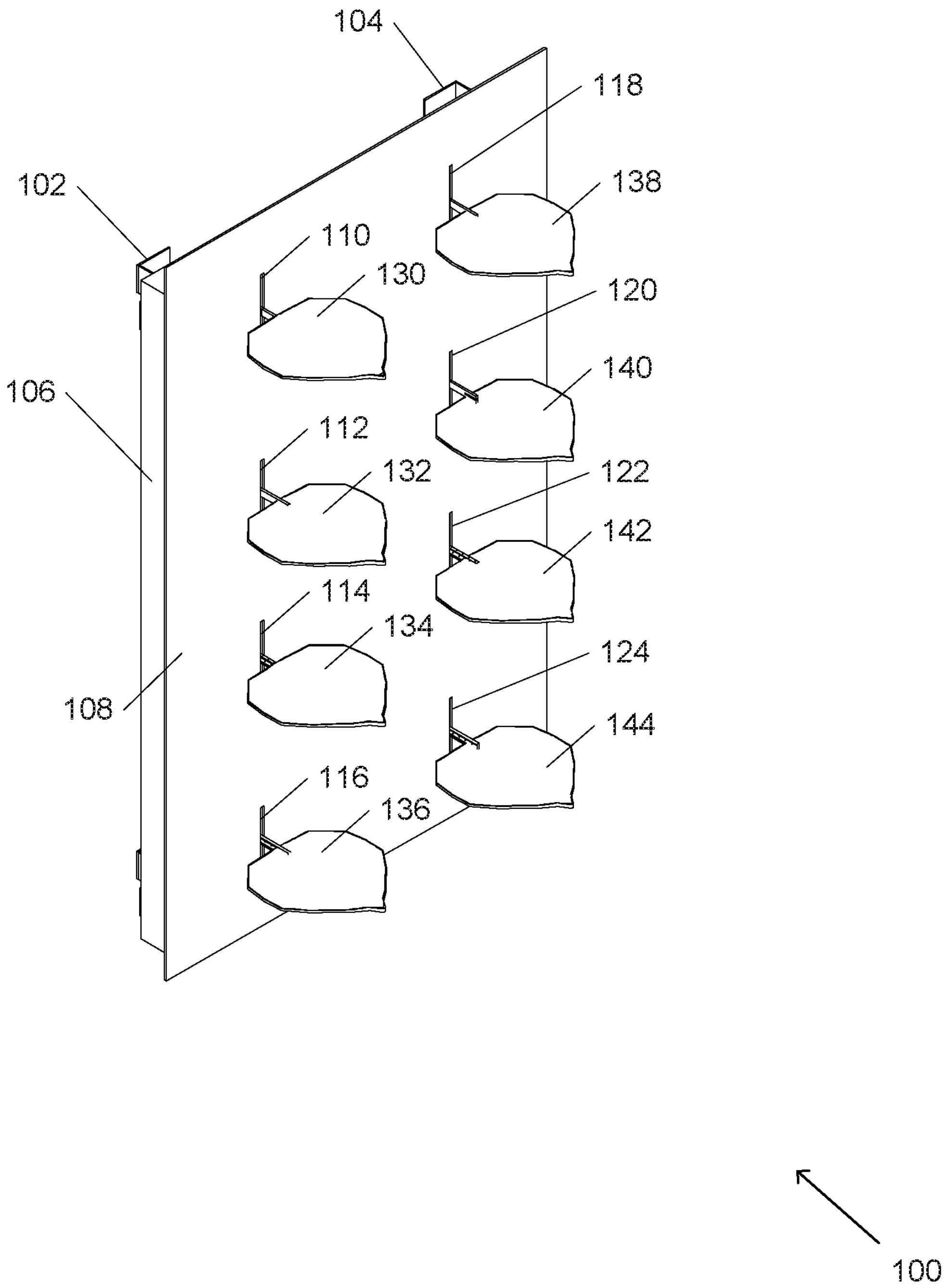
FIG. 1 is a diagram illustrating a wind module panel in accordance with an embodiment of the invention.

The various embodiments of the present wind module panel systems for generating renewable energy contain several features, no single one of which is solely responsible for their desirable attributes. Without limiting the scope of the present embodiments, their more prominent features will now be discussed below. In particular, the present wind module panel systems will be discussed in the context of energy generation for a commercial building structure. However, the use of commercial buildings is merely exemplary as wind module panel systems may be utilized for various environments as appropriate to the requirements of a specific application in accordance with embodiments of the invention. Further, the present wind module panel systems may be described as having a leaf module that has a single leaf or a pair of leaves that have an oscillation motion along a first axis (e.g., a vertical axis) in generating energy. However, the use of a leaf shape, any particular number of leaves (e.g., one or two leaves), leaf orientation, and axis of oscillation are merely exemplary and the oscillating motion may be implemented using a variety of shapes, sizes, numbers of components, and orientations. After considering this discussion, and particularly after reading the section entitled "Detailed Description," one will understand how the features of the present embodiments provide the advantages described here.

The following detailed description describes the present embodiments with reference to the drawings. In the drawings, reference numbers label elements of the present embodiments. These reference numbers are reproduced below in connection with the discussion of the corresponding drawing features. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

Turning now to the drawings, wind module panel systems in accordance with embodiments of the invention are disclosed. In many embodiments, wind module panel systems may include one or more panels (may also be referred to as "wind module panels") that are configured to receive and connect one or more leaf modules. In various embodiments, a leaf module may include an oscillator geometry such as, but not limited to, an oscillator leaf. For example, a leaf module may include a single oscillator leaf or a pair of oscillator leaves (e.g., a first oscillator leaf and a second oscillator leaf) that may flutter in the wind to allow the leaf module to produce electricity (i.e., wind energy), as further described below. In some embodiments, an oscillator leaf may include a stem and/or an exoskeleton (may also be referred to as a "blade") having a covering such as, but not limited to, a marine fabric that assists with capturing wind currents.

As described herein, leaf modules may include one or more oscillator leaves and various components that convert wind currents to wind energy. For example, in some embodiments, leaf modules may include an oscillating component (e.g., a gear rack, a drive belt, etc.) configured to move (e.g., up and down), where the oscillating motion of the gear rack or drive belt may be transferred into a gear box and a microgenerator (e.g., having an electromagnetic coil) for producing wind energy. For example, a leaf module may include an oscillator leaf connected to a microgenerator unit. In a further example, a leaf module may include a plurality of oscillator leaves connected to a microgenerator unit. In some embodiments, the leaf module may include one or more oscillator leaves (e.g., a first oscillator leaf and a second oscillator leaf) that are configured to oscillate when wind is blown across the leaves, as further described below. In some embodiments, the one or more oscillator leaves may be positioned along a vertical axis, and may be connected to a frame. In some embodiments, the frame may include a gear rack (e.g., a linear gear rack, a drive belt, etc.) and/or a rod (e.g., a carbon steel rod) configured to receive an encasement that is configured to house the gear box and microgenerator. In various embodiments, the gear rack and/or drive belt may slide (e.g., up and down) causing gears of the gear box to rotate, as further described below. In several embodiments, the gear box may be utilized to translate the higher torque, lower tooth count gear to a high speed gear that rotates the microgenerator thereby producing electricity. Typically, the more wind that is applied to the one or more oscillator leaves of the leaf module, the greater the oscillation of the one or more oscillator leaves and thus greater the electrical production.

In various embodiments, wind module panel systems may include connected wind module panels and power management for production and utilizing of energy on-site within the building for various uses such as, but not limited to, lighting and electrical outputs. For example, the wind module panels may be connected using various methods, including, but not limited to, utilizing a steel frame connection or an integrated system that can be adapted in many exterior fenestration types. In some embodiments, wind module panels may be applied directly to the building's exterior walls. In some embodiments, wind module panels may be applied to an outer surface that is attached and/or connected to a building. In addition, the leaf modules may be configured in a "plug and play" format where it can be accessed through the wall panel to swap out various components such as, but not limited to, the oscillator leaves, gear rack, drive belt, gear boxes, microgenerators, rectifiers, etc. for maintenance and/or upgrading, as further described below. Wind module panels in accordance with embodiments of the invention are further described below.

Wind Module Panels

Wind module panels and/or leaf modules may be installed in a manner to take full advantage of natural wind flow alongside a building's exterior. In addition, wind module panels and/or leaf modules may be interconnected to create a panelized wall system for new and/or existing construction. Further, individual wind module panels and/or leaf modules may be configured in a "plug and play" system where for maintenance and/or upgrades. In some embodiments, the panelized system may allow for particular wind module panels to be removed so that individual leaf modules may be serviced and/or replaced. In some embodiments, the panelized system may allow for particular leaf module to be removed so that individual leaf modules may be serviced and/or replaced.

As described above, wind module panels may receive one or more leaf modules. However, as further described below, leaf modules may be configured as panels and include various components of wind module panels. In some embodiments, wind module panels and/or leaf modules may be configured with dispersed geometries for maximum "flutter" of oscillator leaves. In some embodiments, wind module panels may include various functionalities such as, but not limited to, control of leaf modules, optimization for electricity generation, diagnosis of technical problems (e.g., outages), etc., as further described below.

A diagram illustrating a wind module panel in accordance with an embodiment of the invention is shown in FIG. 1. The wind module panel 100 may be configured to receive one or more leaf modules. As illustrated in FIG. 1, the wind module panel 100 may receive various leaf modules. For example, in embodiments where the leaf module has a single leaf, the wind module panel 100 may receive eight leaf modules. In a further example, in embodiments where a leaf module has a pair of leaves, the wind module panel 100 may receive four leaf modules, where each leaf module includes two oscillating leaves. The wind module panel 100 may include one or more metal brackets (e.g., a first metal bracket 102 and a second metal bracket 104) for attaching the wind module panel 100 to a building (e.g., to a building's exterior). The wind module panel 100 may also include a frame providing structure to the wind module panel 100. For example, the frame may be a metal tube steel frame 106.

In reference to FIG. 1, the wind module panel 100 may also include an exterior sheet panel 108 having a first side that exposes the oscillating leaves to the wind flow and a second side that shields other components of the leaf modules (e.g., gear box, gear rack, rectifier, etc.). In many embodiments, the exterior sheet panel 108 may include openings that provide space for stems attached to the oscillating leaves to move, as further described below. In some embodiments, the openings may be slots (or any other aperture) that allow the stem of a leaf to move along a first axis (e.g., a vertical axis). In this manner, the slots may allow for the stems to move along the first axis while providing support to reduce the amount of movement of the stems along other directions.

In further reference to FIG. 1, the wind module panel 100 may include one or more openings including but not limited to, a first opening 110, a second opening 112, a third opening, 114, a fourth opening 116, a fifth opening 118, a sixth opening 120, a seventh opening 122, and an eighth opening 124. As further described above, each opening may be configured to receive a leaf of a leaf module. In embodiments, where a leaf module includes a single leaf, the wind module panel 100 may receive eight leaf modules. In some embodiments, where the leaf module includes a pair of leaves, the wind module panel 100 may receive four leaf modules. For example, the first opening 110 and the second opening 112 may receive first and second oscillating leaves 130, 132 of a first leaf module, respectively. Further, the third opening 114 and the fourth opening 116 may receive first and second oscillating leaves 134, 136 of a second leaf module, respectively. Furthermore, the fifth opening 118 and the sixth opening 120 may receive first and second oscillating leaves 138, 110 of a third leaf module, respectively. Moreover, the seventh opening 122 and the eighth opening 124 may receive first and second oscillating leaves 142, 144 of a fourth leaf module, respectively.

As described above, wind module panel systems may be configured to perform various functionalities such as, but not limited to, control of leaf module(s), control of wind module panel(s), optimization for electricity generation at various levels, wireless communication, etc. In some embodiments, the one or more functionalities may be implemented by each wind module panel (may also be referred to as the "panel level"). In some embodiments, the one or more functionalities may be implemented by at least one system control panel connected to a plurality of wind module panels (may also be referred to as the "system level"). In some embodiments, the one or more functionalities may be implemented by each leaf module (may also be referred to as the "leaf level"). In some embodiments, the one or more functionalities may be performed at any level including, but not limited to, the leaf, panel, and/or system level.

Figure 2:
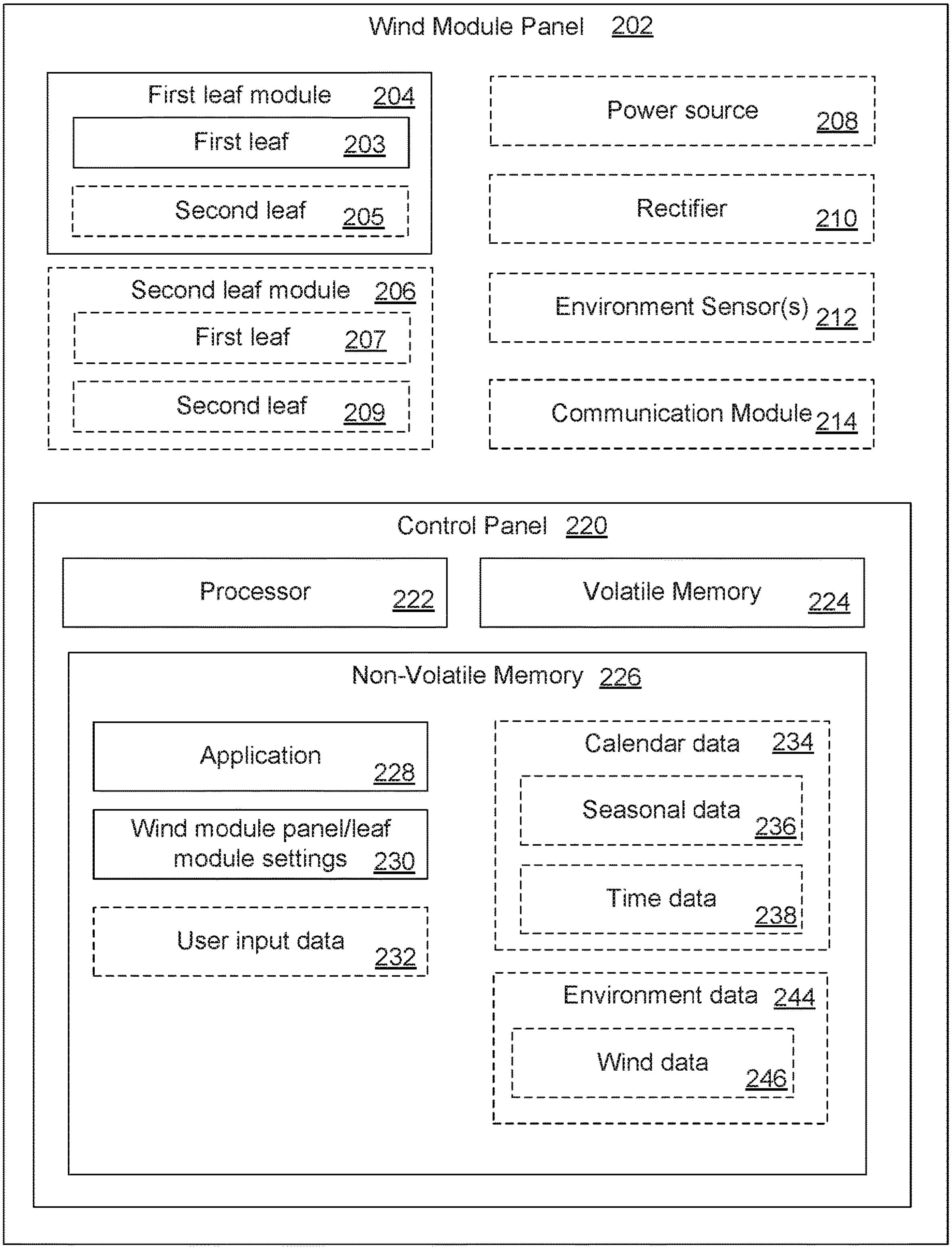
FIG. 2 is a block diagram illustrating a wind module panel with control functionalities in accordance with an embodiment of the invention.

A block diagram illustrating a wind module panel with control functionalities in accordance with an embodiment of the invention is shown in FIG. 2. The wind module panel 202 may include one or more leaf modules such as, but not limited to, a first leaf module 204 and a second leaf module 206 that generate electric current, as further described below. As described herein a leaf module (e.g., the first leaf module 204 and/or the second leaf module 206) may include one or more oscillating leaves. For example, in some embodiments, the first leaf module 204 may include one or more leaves such as, but not limited to, a first leaf 203 and/or a second leaf 205. In some embodiments, the second leaf module 206 may include one or more leaves such as, but not limited to, a first leaf 207 and/or a second leaf 209. The wind module panel 202 may also include a power source 208. In some embodiments, the power source 208 may be a battery, the first and/or second leaf modules 204, 206, a solar panel (not illustrated), or any other power source. In some embodiments, the power source 208 may store energy generated by the first and/or second leaf modules 204, 206. In some embodiments, the power source 208 may be provided at the system level and the wind module panel 202 may connect to the power source 208 in manner known to one of skill in the art.

In reference to FIG. 2, the wind module panel 202 may also include a rectifier 210. In some embodiments, the first and second leaf modules 204, 206, may each include a microgenerator that is turning back and forth in two directions and thus generating an alternating current, as further described below. In various embodiments, the rectifier 210 may convert the alternating current into a direct one by allowing the current to flow through it in one direction, as further described below. In some embodiments, the wind module panel 202 may include a communication module 214 for access to the Internet and/or for wireless communication with various devices, such as, but not limited to, a user's smartphone, laptop, cloud storage, etc. In some embodiments, the wind module panel 202 may also include one or more environment sensor(s) 212 such as, but not limited to, a wind sensor, a rain/moisture sensor, a temperature sensor, etc. The environment sensor(s) 212 may take measurements and the measurements (e.g., environment data 244) may be utilized in setting and/or updating various settings including, but not limited to, wind module panel/leaf module settings 230, as further described below.

In reference to FIG. 2, the wind module panel 202 may also include a control panel 220 that may include a processor 222, a volatile memory 224, and a non-volatile memory 226. In various embodiments, the non-volatile memory 226 may include an application 228 comprising instructions that configures the wind module panel 202 to perform various methods, as further described below. For example, the wind module panel 202 may be configured to operate the first and/or second leaf modules 204, 206, using the wind module panel/leaf module settings 230. In some embodiments, the wind module panel/leaf module settings 230 may be utilized to configure the oscillating leaves of the first and/or second leaf modules 204, 206. In some embodiments, the wind module panel/leaf module settings 230 may be utilized to configure the microgenerators of the first and/or second leaf modules 204, 206. In some embodiments, the wind module panel/leaf module settings 230 may be set and/or updated using user input data 232, calendar data 234 (e.g., seasonal data 236 and/or time data 238), and/or environment data 244 (e.g., wind data 246), as further described below.

In reference to FIG. 2, the various components of the wind module panel 202 may be part of and/or implemented at a system level. Further, the various components including (but not limited to) the control panel 220 are represented by separate boxes. The graphical representations depicted in FIG. 2 are merely examples and are not intended to indicate that any of the various components of the wind module panel 202 are necessarily physically separate from one another, although in some embodiments they might be. In some embodiments, however, the structure and/or functionality of any or all components of the wind module panel 202 may be combined. In some embodiments, the processor 222 may include, but is not limited to, any generic processing unit capable of performing computations. The volatile memory 224 may include, but is not limited to, Randomly Accessed Memory (RAM) or another comparable form of rapid storage. Non-volatile memory 226 may include, but are not limited to, any memory type that retains storage of data after powering down. In addition, in some embodiments, the communication module 214 may include its own processor, volatile memory, and/or non-volatile memory. In addition, the communication module 214 may comprise, but are not limited to, one or more transceivers and/or wireless antennas (not shown) configured to transmit and receive wireless signals such as (but not limited to) satellite, radio frequency (RF), Bluetooth or WIFI. In other embodiments, the communication module 214 may comprise (but are not limited to) one or more transceivers configured to transmit and receive wired signals.

Figure 3:
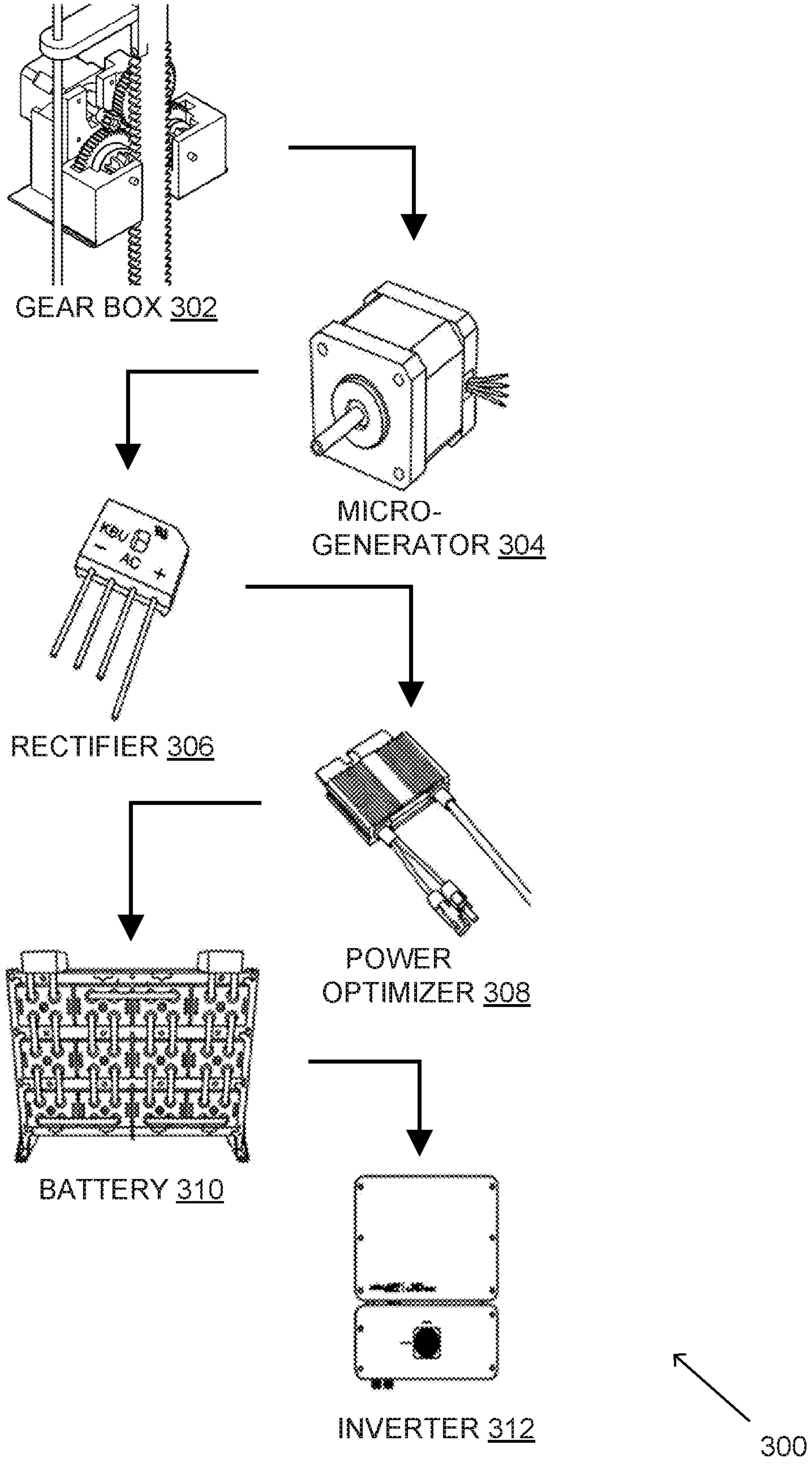
FIG. 3 is a diagram illustrating renewable energy generation using wind module panels in accordance with an embodiment of the invention.

FIG. 3 is a diagram illustrating renewable energy generation using wind module panels in accordance with an embodiment of the invention. As described herein, energy production is generated through an oscillating motion (e.g., vertical oscillating motion) that is transferred into a gear box 302 from a gear rack to a micro-generator/DC motor 304. In some embodiments, since this generator 304 is turning back and forth in two directions, the electrical current is alternating positive to negative depending on its motion (e.g., upward or downward vertically). To allow the electrical current to stay in a DC format, a rectifier 306 may be utilized. In many embodiments, the rectifier 306 may convert the AC current to DC current to keep the flow moving in only one direction. In various embodiments, each wind module panel may include a plurality of leaf modules with their own microgenerator and rectifier within its design.

In reference to FIG. 3, in some embodiments, each wind module panel may include output wires that may be connected back to a power optimizer 308. For example, two or more wind module panels may be connected back to a power optimizer 308. In some embodiments, leaf modules of a wind module panel may be connected, where each wind module panel may include a power optimizer 308. In some embodiments, a wind module panel system may include one or more power optimizers 308. In various embodiments, the power optimizer 308 may be a DC to DC converter that uses maximum power point tracking (MPPT) to improve and maximize the energy harvesting from the wind module panels and/or the leaf modules. In many embodiments, the power optimizer 308 accounts for each wind module panel and/or leaf module producing energy in a slightly different capacity at each moment in time.

In further reference to FIG. 3, once the wind module panels and/or leaf modules are connected together and outputted through the power optimizer 308, the conduit may be routed to a system battery 310 to store the energy. In some embodiments, the energy may be stored in DC until it is pulled to be used. Once the energy using source pulls the energy it may be transferred through an inverter 312 into AC current for end use.

Although specific wind module panels and wind module panel systems are discussed above with respect to FIGS. 1-3, any of a variety of wind module panels and wind module panel systems and components as appropriate to the requirements of a specific application may be utilized in accordance with embodiments of the invention. For example, wind module panels may be configured to receive any number of leaf modules, attached to various structures and structure configurations (e.g., various buildings, building shapes, attachments of buildings, etc.). Further, wind module panels may be configured in various shapes including, but not limited to, rectangular, square, triangular, etc., and may be configured to interconnect. Furthermore, wind module panels may include or exclude control functionalities as appropriate to the requirements of a specific application. For example, control functionalities may be implemented at various levels (e.g., system level, panel level, or leaf level) as appropriate to the requirements of a specification application. Moreover, steps in the renewable energy generation (e.g., steps described above implemented using a rectifier, power optimizer, battery, inverter, etc.) may be implemented at various levels (e.g., system level, panel level, or leaf level) as appropriate to the requirements of a specification application. Leaf modules in accordance with embodiments of the invention are further described below.

Leaf Modules

Taking advantage of the forces of natural wind currents, an oscillating geometry (e.g., oscillator leaves) may act as a cantilever beam, inducing electrical current on a solenoid coil (e.g., a microgenerator) attached to a gear box. As further described below, the gear box may be in connection with various connectors such as, but not limited to, a gear rack or a drive belt, where the movement of the gear rack or drive belt may cause one or more gears of the gear box to rotate to induce electrical current on the attached microgenerator. In many embodiments, the microgenerator and the gear box may be housed in an encasement that may be fixed in place on a wind module panel (e.g., on a second side of the wind module panel) and the oscillation of the one or more leaves may cause movement of the gear rack and thereby rotating the one or more gears of the gear box. In various embodiments, leaf module(s) (and/or the wind module panel(s)) may feed the electrical current to a main circuit for use within the building, as further described below.

Figure 4A:
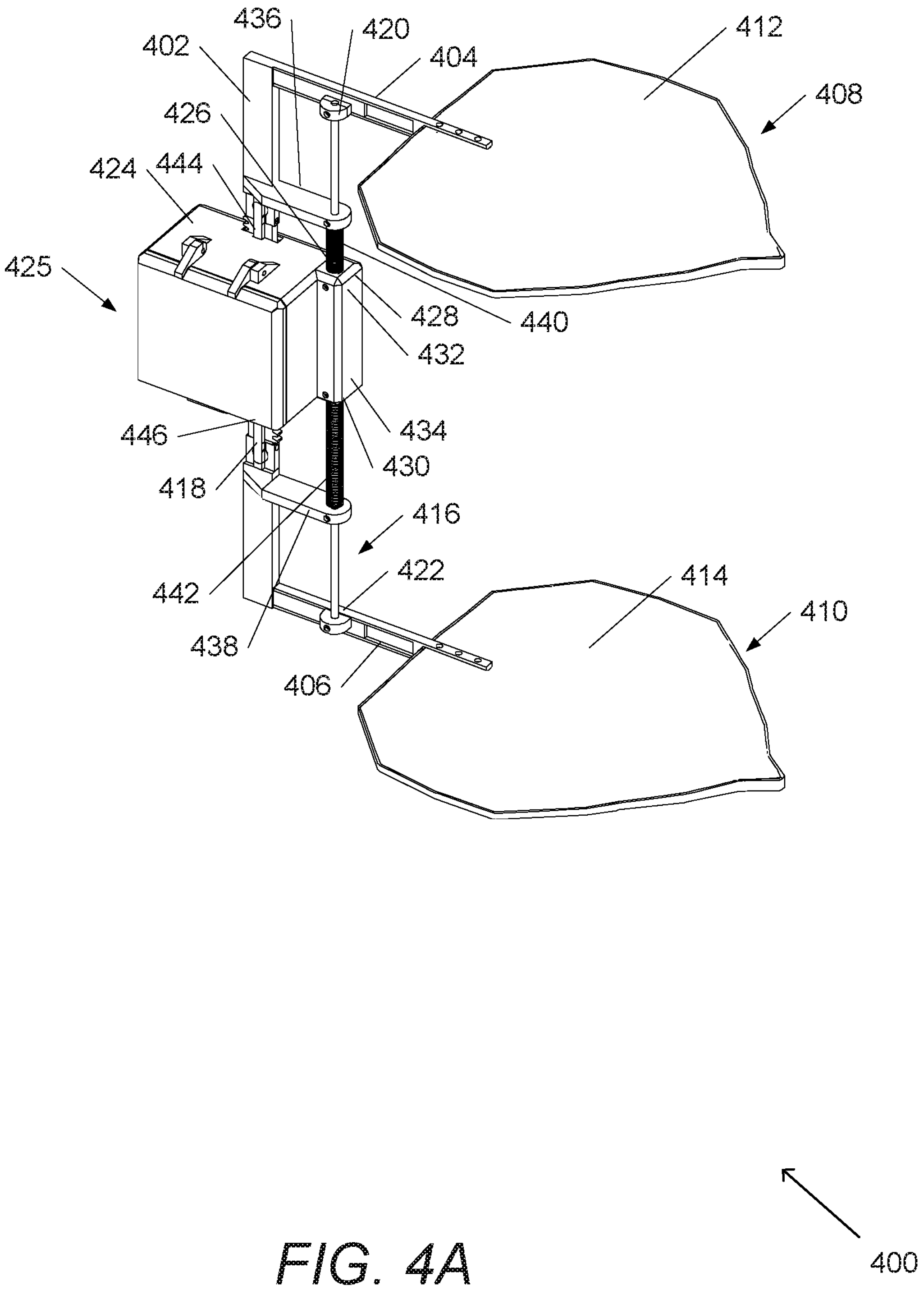
FIG. 4A is a schematic diagram illustrating a leaf module with a pair of oscillator leaves (may also be referred to as "leaves"), in a closed configuration, in accordance with an embodiment of the invention.

FIG. 4A is a schematic diagram illustrating a leaf module with a pair of oscillator leaves, in a closed configuration, in accordance with an embodiment of the invention. The leaf module 400 may include a gear rack frame 402 having a first stem 404 and a second stem 406 configured to receive a first oscillator leaf 408 and a second oscillator leaf 410, respectively. In some embodiments, the first and second oscillator leaves 408, 412 may be attached to the first and second stems 404, 406, respectively, using one or more attachment mechanisms such as, but not limited to, screws, nuts and bolts, pins, clips, rivets, clamps, fasteners, etc. In some embodiments, the stem may be part of the oscillator leave instead of the gear rack frame. For example, the first oscillator leaf 408 may include the first stem 404 and the second oscillator leave 410 may include the second stem 406. In some embodiments, the first and second oscillator leaves 408, 410 may include an exoskeleton (may also be referred to as a "blade") 412, 414, respectively, having a covering such as, but not limited to, a marine fabric that assists with capturing wind currents. The blade 412, 414 and various components described herein may be 3D printed using various materials including, but not limited to, polylactic acid (PLA) based materials.

In reference to FIG. 4A, the leaf module 400 may also include a rod 416 and a gear rack 418. In some embodiments, the rod 416 may include a first end 420 that is attached to the first stem 404 and a second end 422 that is attached to the second stem 406. In many embodiments, the encasement 424 may include a cavity for receiving the rod 416 and one or more openings for receiving the gear rack 418. For example, the encasement 424 may include a cavity 426 that receives the rod 416. In various embodiments, the cavity 426 may have a first end 428 and a second end 430. In some embodiments, the first end 428 of the cavity 426 may receive a first linear ball bearing 432 and the second end 430 of the cavity 426 may receive a second linear ball bearing 434. In several embodiments, the leaf module 400 may also in a first support member 436 and/or a second support member 438. In some embodiments, the first and/or second support members 436, 438 may be attached to the gear rack frame 402 and include holes that are configured to receive the rod 416 and provide support to the rod 416.

In further reference to FIG. 4A, the leaf module 400 may also include a first spring 440 (e.g., a first compression spring) that is placed between the first linear ball bearing 432 and the first support member 436. The leaf module 400 may also include a second spring 442 (e.g., a second compression spring) that is placed between the second linear ball bearing 434 and the second support member 438. The first and second springs 440, 442 may be configured to allow the rod 416 to traverse longitudinally through the first and second springs 440, 442. In a variety of embodiments, the first and second springs 440, 442 may assist in allowing the gear rack 418 to move up and down (when in a vertical configuration) relative to the gear box 425, as further described below. In many embodiments, the first and second springs 440, 442 may have the same or different spring constants. For example, the second spring 442 may have a spring constant (i.e., may be referred to as the "second spring constant") that is greater than the spring constant of the first spring 440 (may be referred to as the "first spring constant"). In particular, when the leaf module 400 is in a vertical configuration within a wind module panel, the second spring constant may be greater than the first spring constant to account for gravity acting on the leaf module 400.

In reference to FIG. 4A, the encasement 424 may include a first opening 444 and a second opening 446 for receiving the gear rack 418. In some embodiments, the first and second openings 444, 446 may be configured to allow the gear rack 418 to move relative to the gear box 425 (e.g., up and down), as further described below. As further described above, the encasement 424 that may be fixed in place on a second side of the wind module panel and the oscillation of the first and second leaves 408, 410 may cause movement of the gear rack 418 (e.g., up and down) and thereby rotating the one or more gears of the gear box 425. In some embodiments, the movement of the gear rack 418 relative to the gear box 425 may be aided by the first and/or second springs 440, 442, as further described above. In many embodiments, the gear rack 418 may include teeth configured to link with one or more gears of the gear box 425, as further described below.

Figure 4B:
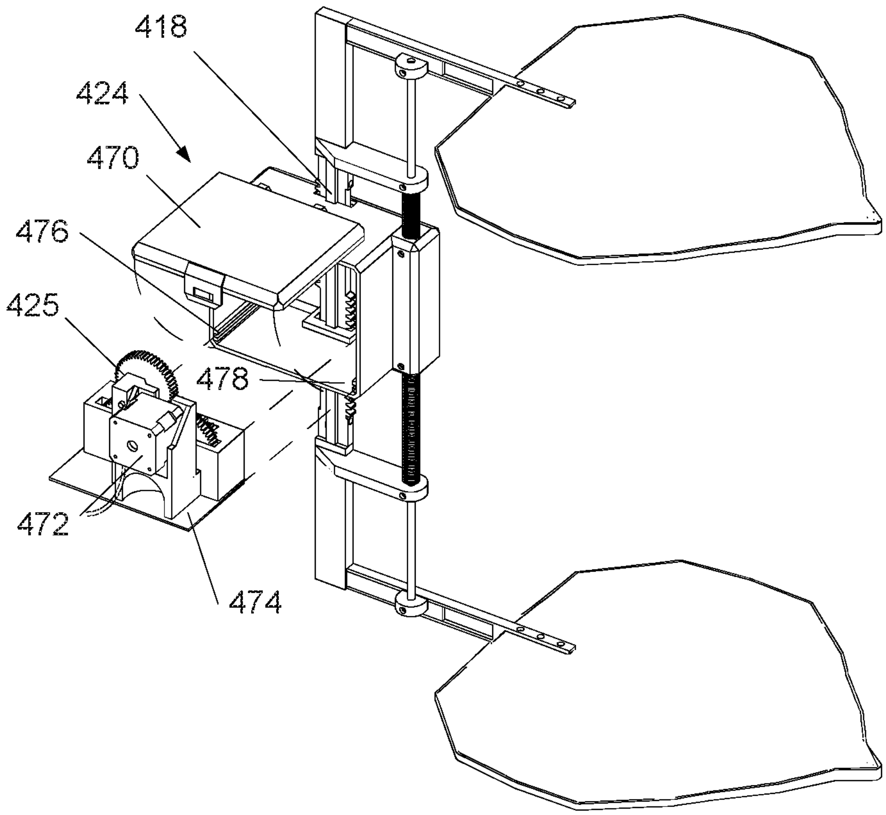
FIG. 4B is a schematic diagram illustrating a leaf module with a pair of leaves, in an open configuration, accordance with an embodiment of the invention.

A schematic diagram illustrating a leaf module with a pair of leaves, in an open configuration, accordance with an embodiment of the invention is shown in FIG. 4B. In some embodiments, the encasement 424 may include a lid 470 that opens to provide access to the gear box 425 and microgenerator 472. In some embodiments, the gear box 425 and microgenerator 472 may be configured onto a platform 474. In some embodiments, the encasement 424 may include tracks (e.g., first tracks 476 and second tracks 478) configured to mate with the platform 474 by allowing the platform 474 to slide in and out of the encasement 424. When the platform 474 is slid out of the encasement 424, the gear box 425 and/or microgenerator 472 may be accessible for inspection, repairs, and/or replacement. When the platform 474 is slid into the encasement 424, the first and/or second tracks 476, 478 may be configured to allow the platform 474 to a specific location such that the one or more gears of the gear box 425 align with the teeth of the gear rack 418, as further described below. In some embodiments, the lid 470 of the encasement 424 may be closed (and locked) when the platform 474 is correctly slid into the first and/or second tracks 476, 478 of the encasement 424.

Figure 4C:
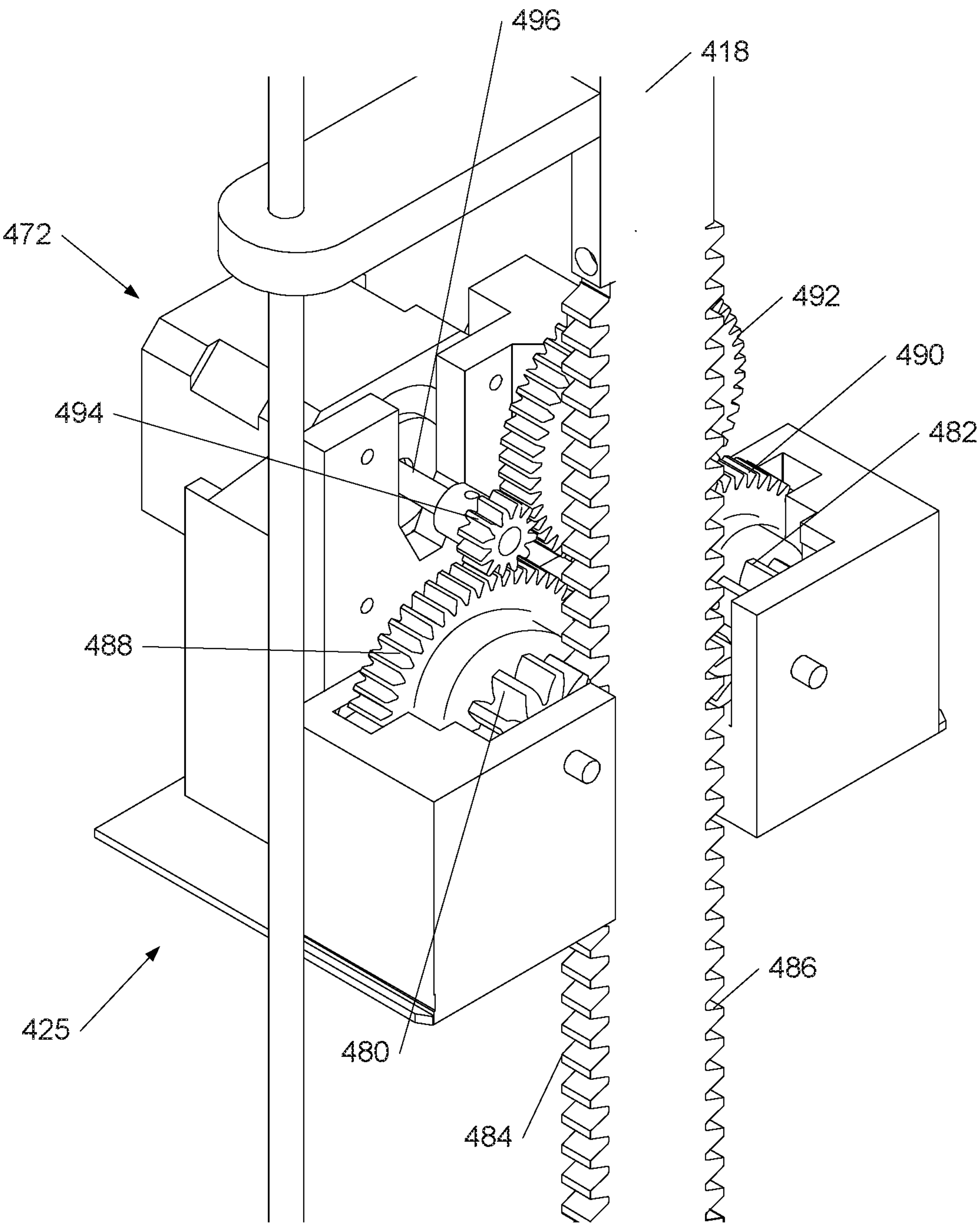
FIG. 4C is a schematic diagram illustrating a gear box of a leaf module with a pair of leaves in accordance with an embodiment of the invention.

A schematic diagram illustrating a gear box of a leaf module in accordance with an embodiment of the invention is shown in FIG. 4C. The gear box 425 may include may include one or more gears that mesh with teeth of a gear rack 418. For example, the gear box 425 may include a first gear 480 and a second gear 482 that attaches to a first set of teeth 484 and a second set of teeth 486 of the gear rack 418, respectively. In many embodiments, the first gear 480 and the second gear 482 may rotate in opposite directions based on the movement of the gear rack 418. For example, when the gear rack 418 moves down, the first gear 480 may rotate in a first direction (e.g., clockwise) and the second gear 482 may rotate in a second direction (e.g., counter clockwise). Further, when the gear rack 418 moves up, the first gear 480 may rotate in the second direction (e.g., counter clockwise) and the second gear 482 may rotate in the first direction (e.g., clockwise).

In reference to FIG. 4C, the first gear 480 may be attached to a first intermediate gear 488 such that the rotation of the first gear 480 causes the rotation of the first intermediate gear 488. Similarly, the second gear 482 may be attached to a second intermediate gear 490 such that the rotation of the second gear 482 causes the rotation of the second intermediate gear 490. In some embodiments, the first intermediate gear 488 and the first gear 480 may be a singular piece. In some embodiments, the first intermediate gear 488 and the first gear 480 may be separate pieces that are attached. In some embodiments, the second intermediate gear 490 and the second gear 482 may be a singular piece. In some embodiments, the second intermediate gear 490 and the second gear 482 may be separate pieces that are attached. In some embodiments, the first intermediate gear 488 may have a diameter larger than the diameter of the first gear 480. In some embodiments, the second intermediate gear 490 may have a diameter larger than the diameter of the second gear 482.

In further reference to FIG. 4C, the first and second intermediate gears 488, 490 may rotate directionally based on the direction of rotation of the first and second gears 480, 482, respectively. For example, when the first gear 480 rotates in the first direction (e.g., clockwise), then the first intermediate gear 488 may also move in the first direction (e.g., clockwise). Further, when the first gear 480 rotates in the second direction (e.g., counter clockwise), then the first intermediate gear 488 may also move in the second direction (e.g., counter clockwise). Likewise, when the second gear 482 rotates in the second direction (e.g., counter clockwise), then the second intermediate gear 490 may also move in the second direction (e.g., clockwise). Further, when the second gear 482 rotates in the first direction (e.g., clockwise), then the second intermediate gear 490 may also move in the first direction (e.g., clockwise).

In further reference to FIG. 4C, the gear box 425 may include a third gear 492 that may be intermeshed with the second intermediate gear 490 and a fourth gear 494 that is attached to a shaft 496 of the microgenerator 472. In some embodiments, fourth gear 494 may also be intermeshed with the first intermediate gear 488. In many embodiments, the rotation of the fourth gear 494 provides the microgenerator 472 with the mechanical input to generate electricity, as further described below.

As described above, a leaf module may include any number of leaves including, but not limited to, a single leaf or a pair of leaves. Further, a leaf module may incorporate various components including, but not limited to, components of a wind module panel as appropriate to the requirements of a specific application. In some embodiments, the leaf modules may incorporate panel components and a plurality of leaf modules may be connected at the system level. In such embodiments, the leaf level may incorporate any and/or all of the functionalities of the panel level.

Figure 5A:
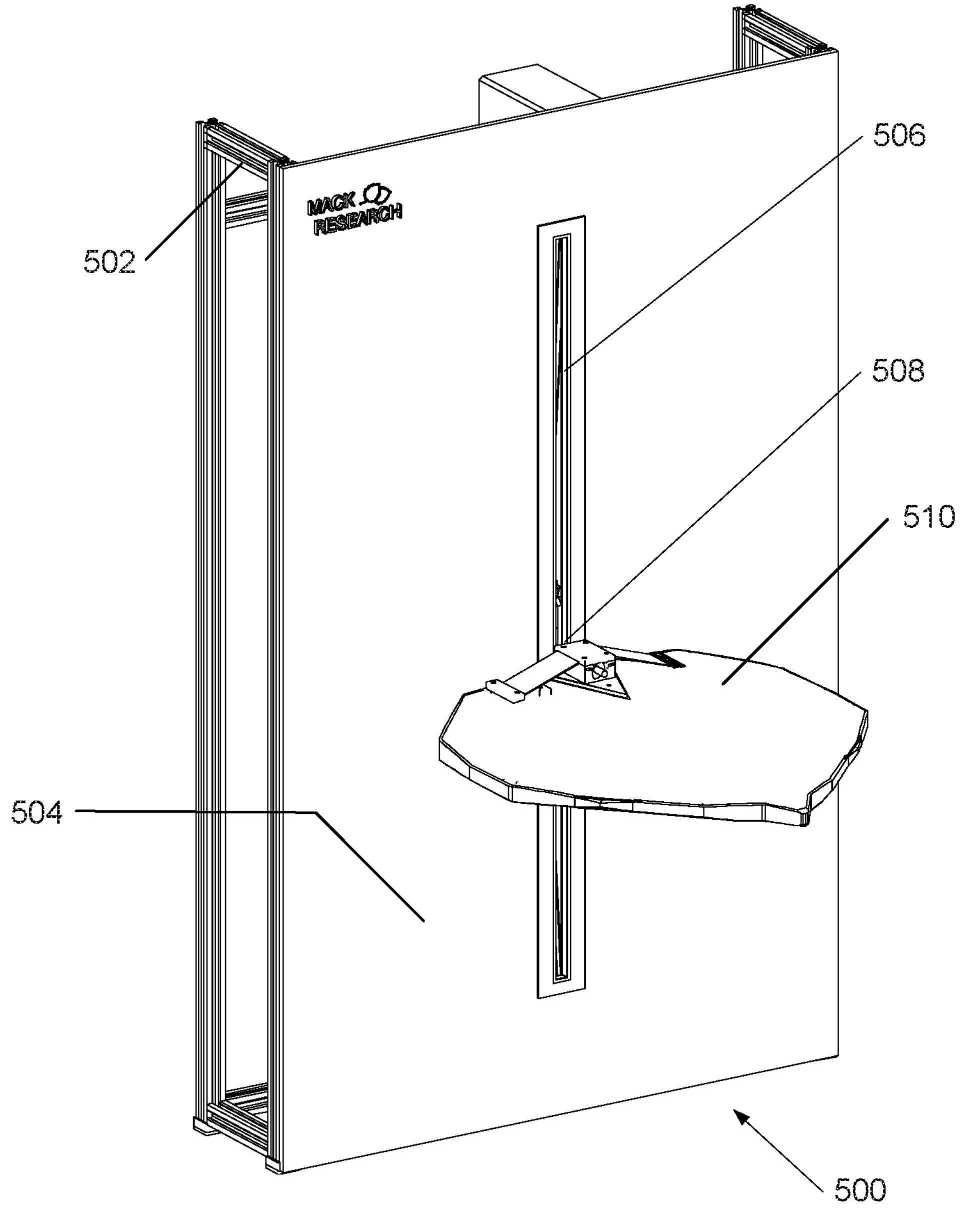
FIG. 5A is a schematic diagram illustrating a first side of a leaf module with a single oscillator leaf (may also be referred to as a "leaf") in accordance with an embodiment of the invention.

A schematic diagram illustrating a first side of a leaf module with a single oscillator leaf in accordance with an embodiment of the invention is shown in FIG. 5A. The leaf module 500 may include a frame 102 (e.g., a metal frame)

that may be utilized to provide structure to the leaf module 500 including the various components of the leaf module 500. In some embodiments, the frame 102 may be utilized to attach the leaf module 500 to a building (e.g., to a building's exterior, to support/attachments to a building, etc.). In some embodiments, the frame 102 may be utilized to attach the leaf module 500 to a wind panel module. In such embodiments, the wind panel module may attach to a building, as further described above.

In reference to FIG. 5A, the leaf module 500 may also include an exterior sheet panel 504 having a first side that exposes the oscillating leaf 510 to the wind flow and a second side that shields various components of the leaf module 500. The exterior sheet panel 504 may include openings (e.g., slot 506) that provides space for a stem attached to the oscillating leaf 510 to move. As further described above, the slot 506 may be configured to allow the stem 508 of the leaf 510 to move along a first axis (e.g., a vertical axis). In this manner, the slot 506 may allow for the stem 508 to move along the first axis while providing support to reduce the amount of movement of the stem 508 along other directions.

Figure 5B:
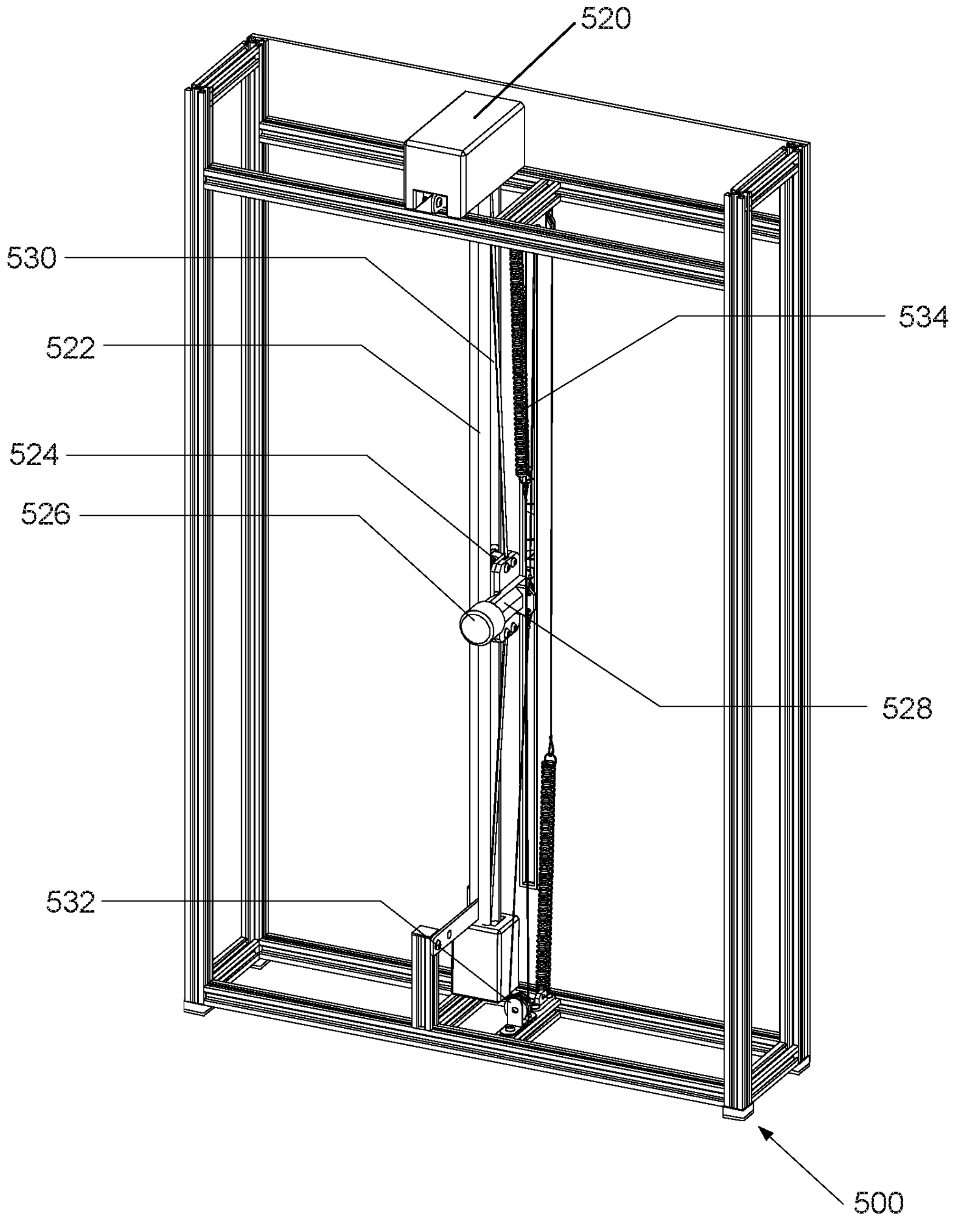
FIG. 5B is a schematic diagram illustrating a second side of a leaf module with a single leaf in accordance with an embodiment of the invention.

A schematic diagram illustrating a second side of a leaf module with a single leaf in accordance with an embodiment of the invention is shown in FIG. 5B. The leaf module 500 may include a gear box 520 housing various components for energy generation such as, but not limited to one or more gears, one or more microgenerators, etc., as further described above. In some embodiments, the gear box 520 may also include various sensors, as further described above.

In reference to FIG. 5B, the leaf module 500 may include linear rail 522 configured to receive a linear carriage 524 that may oscillate based on the movement of the leaf 510. For example, leaf 510 may be attached to the linear carriage 522 via the stem 508. In some embodiments, the linear carriage 522 may include a counter balance 526 and a torsional spring 528 to optimize the energy generation. For example, torsional spring 528 may facilitate direction reversal at the end of each stroke, whether an upstroke or downstroke, to continue the oscillating motion, as further described below. For example, the torsion spring 528 may exert torque when twisted causing a direction reversal at the end of each stroke. Further, the counter balance 526 may counter the weight of the leaf 510 assisting in the oscillation of the leaf 510 (and the linear carriage 524) along the first axis (e.g., the vertical axis).

In many embodiments, consideration of the physics and fundamental mathematics of motion may be important. Further, aerodynamics may be evaluated, focusing on the relationship between air pressure and solid forms (e.g., of the leaf 510). In various embodiments, the leaf module 500 may operate on a single plane flow, but with a symmetrical airfoil (e.g., leaf 510) that allows flow from both sides, as further described below. In many embodiments, this movement may be translated to a microgeneration system housed with the gear box 520.

In further reference to FIG. 5B, the stem 508 may be a rod (e.g., a carbon steel rod) that may be connected to the linear carriage 524. In various embodiments, the leaf 510 (and the stem 508) may oscillate vertically, driving a drive belt 528 that rotates gears to produce energy through a microgenerator. In some embodiments, the leaf module 500 may include a cable pulley 532 and one or more vertical springs 534 to assist in maximizing oscillation. For example, the drive belt 528 may be connected to the cable pulley 532, the linear carriage 524, and the one or more gears of the gearbox 520.

In some embodiments, the gearbox 520 may translate higher torque from a low tooth-count gear to a high-speed gear that rotates the microgenerator. For example, the gearbox 520 may include a first gear and a second gear, wherein the first and second gears are intermeshing and have differing tooth counts resulting in a differing gear ratio. In addition, the gear box 520 may include one or more belts in assisting with the rotation of the microgenerator.

Figure 5C:
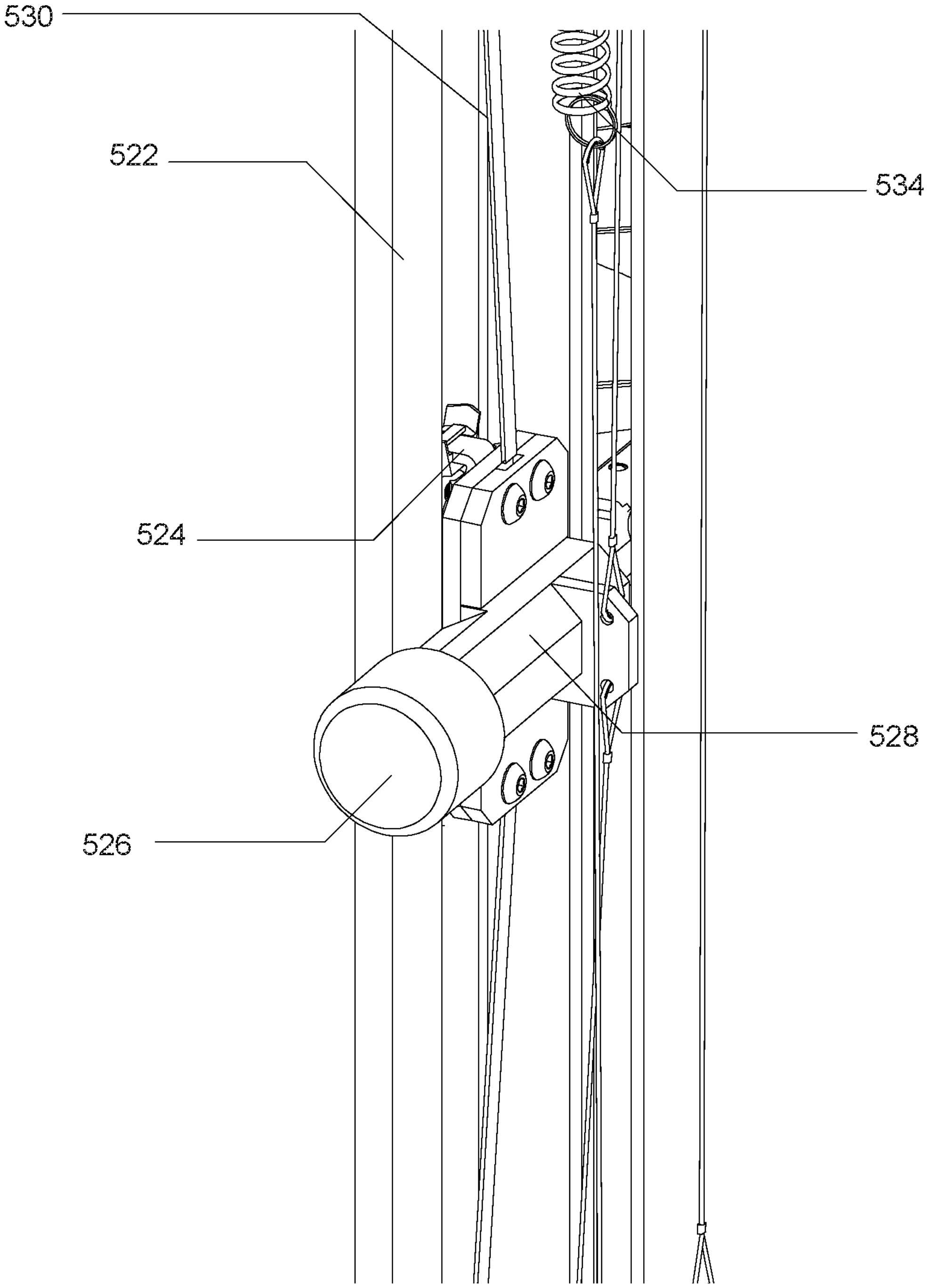
FIG. 5C is a close-up view of a leaf module with a single leaf in accordance with an embodiment of the invention.

A close-up view of a leaf module with a single leaf in accordance with an embodiment of the invention is shown in FIG. 5C. As described above, the leaf may be connected to the linear carriage 524, where the linear carriage 524 moves vertically along the linear rail 522. In many embodiments, the vertical motion (e.g., up and down oscillation) may be optimized using a counter balance 526 and various springs (e.g., vertical spring(s) 534, torsion spring(s) 528, etc.).

In further reference to FIGS. 5A-C, the leaf module 500's various components may be manufactured using various methods including, but not limited to, 3D printing. In many embodiments, the leaf 510 may include marine fabric and a 3D-printed airfoil frame. Increased wind, within the system's operational range, may enhance oscillation and electrical production, stored on-site. In some embodiments, a design may predominantly use 3D-printed carbon fiber polymer plastic and small interior components.

Although specific leaf modules are discussed above with respect to FIGS. 4A-5C, any of a variety of leaf modules and components as appropriate to the requirements of a specific application may be utilized in accordance with embodiments of the invention. For example, leaf modules may be configured using any number of oscillator leaves, oscillator leaf shapes and sizes, frames, encasements, gear racks, springs, bearings, etc. Further, the gear box may include various gears including, but not limited to, various numbers and shapes of gears, and intermeshing of gears. Further, the gear box may utilize additional components such as, a mainspring, electronic oscillator regulated by a quartz crystal, etc., in providing mechanical energy to the microgenerator. Optimization of leaf modules in accordance with embodiments of the invention are further described below.

Leaf Module Optimization

In many embodiments, fluid dynamics may be utilized to produce oscillation by a geometric form and wind flow. Taking known geometries of energy production, an extrapolated geometry may be created and tested for optimization. For example, testing may be conducted in various manners including, but not limited to using computational fluid dynamics (CFD) to understand how the geometry produces pressure fluctuations. After a geometric form is configured to oscillate at a relative rate, the energy production mechanism may be developed. In some embodiments, a digital twin may be created to simulate any number (e.g., thousands) of operating conditions under constant and variable wind flows.

Figure 6:
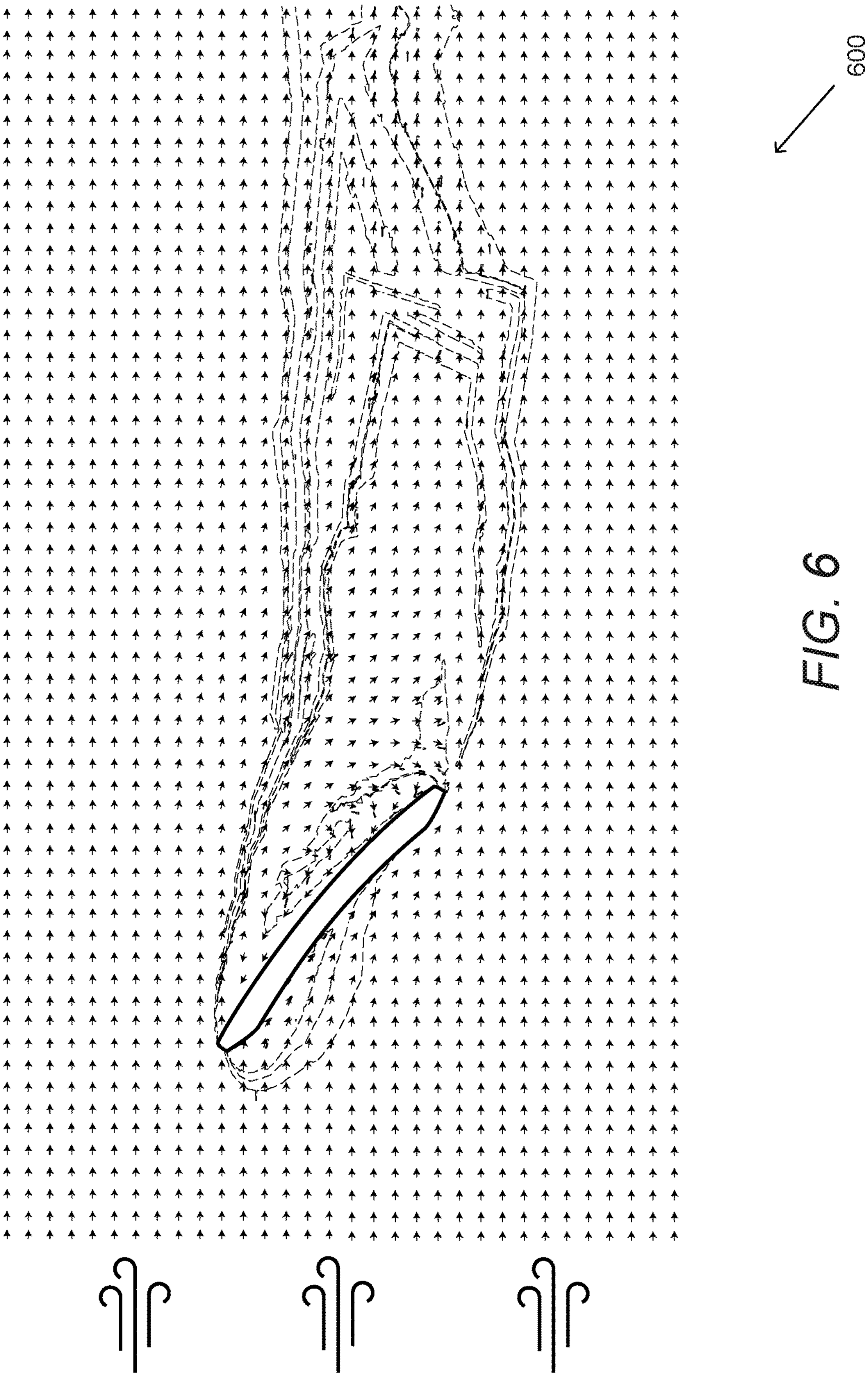
FIG. 6 is a computational fluid dynamics diagram illustrating pressure fluctuations of an oscillator leaf in accordance with an embodiment of the invention.

As described above, the wind causes the one or more oscillator leaves of leaf modules to vibrate. In particular, the rate and strength of vibration may be dependent on various factors including, but not limited to, the strength of the wind (i.e., air pressure), shape and materials of the oscillator leaf, etc. Aerodynamics of potential oscillator leaves may be evaluated for the relationship between air pressure and a solid form. A CFD diagram illustrating pressure fluctuations of an oscillator leaf in accordance with an embodiment of the invention is shown in FIG. 6. The CFD diagram 600 illustrates velocity magnitudes in cm/s. In some embodiments, transverse galloping and vortex shedding may be explored. Transverse galloping means that when air velocity gets to a critical point, the transverse vibration, or oscillation continues to increase as the air flow increases. In some embodiments, the leaf module may work on a singular plane flow providing the means of oscillation for the device. Taking this into account and translating the movement to the microgenerator may be optimized.

In reference to FIG. 6, CFD may be performed on an oscillating component to predict pressure fluctuations induced by an example geometry. In many embodiments, the geometry itself may be based on shapes that have already been proven to create oscillation. Testing may lead to a design achieving a pressure fluctuation from airflow. In some embodiments, the CFD analysis studies may be done in Autodesk CFD, which allows for very specific set up of the geometries and the flow across it. The studies may be performed on various iterations of a leaf module based on various ranging wind flows including, but not limited to, the average US wind flow (e.g., 10 mph or 4.47 m/s).

Figure 7:
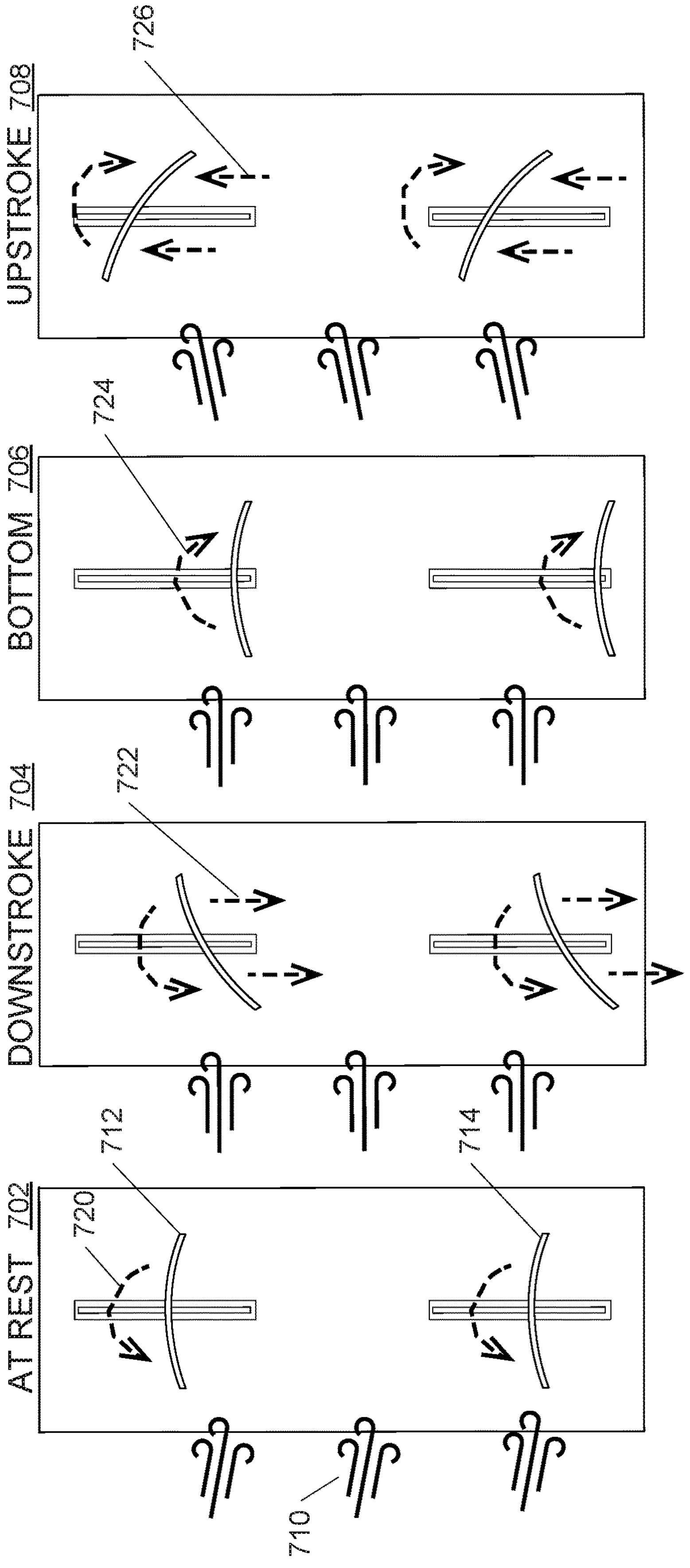
FIG. 7 is a motion diagram illustrating movement of an oscillator leaf based on wind in accordance with an embodiment of the invention.

A motion diagram illustrating movement of an oscillator leaf based on wind in accordance with an embodiment of the invention is shown in FIG. 7. In some embodiments, a leaf (e.g., a first leaf 712, second leaf 714, etc.) may have various positions and/or movements, such as, but not limited to, at rest 702, downstroke 704, bottom 706, and upstroke 708. In many embodiments, the positions and/or movements of the leaves 712, 714 may be based various factors, including, but not limited to, the direction of the wind 710 relative to the rotation of a leaf. For example, in step 1 (at rest 702), the leaf 712 may take on wind 710, causing the leaf 712 to rotate counter-clockwise 720. In step 2 (downstroke 704), the leaf 712 may oscillate in a downward motion 722. In step 3 (at bottom 706), the leaf 712 may rotate clockwise 724. In step 4 (upstroke 708), the leaf 712 may oscillate in an upward motion 726.

In reference to FIG. 7, the leaves 712, 714 may function in an oscillating motion, activated by wind 710, impacting the device. As described above, this oscillation may be characterized by the upstroke 708 or the downstroke 704, which may depend on the wind's 710 incident angle. For example, upon wind 710 contact, the first and/or second leaves 712, 714 may tilt (i.e. rotate) to catch the lift, increasing its speed and enhancing the system's overall efficiency. This tilting mechanism may be advantageous, as it may optimize the first and/or second leaves' 712, 714 interactions with the wind 710, ensuring the device captures the maximum possible energy from the airflow.

In further reference to FIG. 7, the system's efficiency may rely on the precise alignment and movement of the leaves 712, 714. When the wind 710 hits the device at a specific angle, the first and second leaves 712, 714 tilt upward or downward, creating an optimal lift that propels the leaf faster. This rapid movement may allow the device to harness the kinetic energy of the wind 710 more effectively. The oscillating motion continues as the wind's force fluctuates, maintaining a dynamic interaction that maximizes energy capture.

To maintain optimal performance, a system may occasionally send a jumpstart to a motor. This jumpstart may be advantageous for aligning the oscillation frequency of the geometry with the prevailing wind speed, especially during variable wind conditions. By doing so, the system can enter its natural oscillation frequency more quickly and efficiently, ensuring consistent energy generation.

In further reference to FIG. 7, at the end of each stroke, whether an upstroke or downstroke, the system may reverse direction to continue its oscillating motion. In some embodiments, this directional shift may be facilitated by a torsional spring (e.g., torsion spring 528) integrated within the connecting shaft. In some embodiments, the torsional spring may play a vital role by storing energy during the stroke and releasing it at the end, providing the necessary force to initiate the reverse motion. This "spring back" mechanism may ensure smooth and continuous oscillation, enabling the device to consistently harness wind energy. In various embodiments, the interplay of aerodynamic design, mechanical components, and control systems may ensure that the leaf may effectively convert wind energy into oscillating motion, thereby maximizing energy production efficiency.

In many embodiments, leaf module (and overall system) optimization may consider passive and/or active potentials. For example, the leaves may utilize a torsional spring with a specific spring coefficient tailored to the microclimate. This allows the system to respond to incoming wind conditions by rotating the geometry in the opposite direction, enabling both downstrokes and upstrokes. The spring tension provides the system with the ability to "spring back" at the end of each stroke. These torsional springs can be implemented in various ways. The spring can have a passive design, maintaining a constant spring coefficient throughout the system's energy production based on the climate. Alternatively, it can have a controlled active system, where the spring coefficient is adjusted in response to real-time wind speed data from sensors or climate forecasts. The active system allows the design to produce energy across a broader range of climate conditions.

In addition, a system's generator design can also have active or passive capabilities. For example, in a passive mode, the generator may provide a small initial boost at the start of the wind-induced stroke and then allow the leaf to oscillate passively across different wind conditions. Alternatively, the system can incorporate a proportional-integral-derivative (PID) controller, which may actively induce movement of the leaf using some energy to maintain the appropriate speeds required for various wind flows. These speeds and induced movements may be refined through computer simulations and real-time testing to determine the exact times when using energy to maintain movement increases overall energy output.

Although specific analysis of leaf modules is discussed above with respect to FIGS. 6-7, any of a variety of analysis and optimization of leaf modules as appropriate to the requirements of a specific application may be utilized in accordance with embodiments of the invention. Processes for wind module panel systems in accordance with embodiments of the invention are further described below.

Processes for Wind Module Panel Systems

Figure 8:
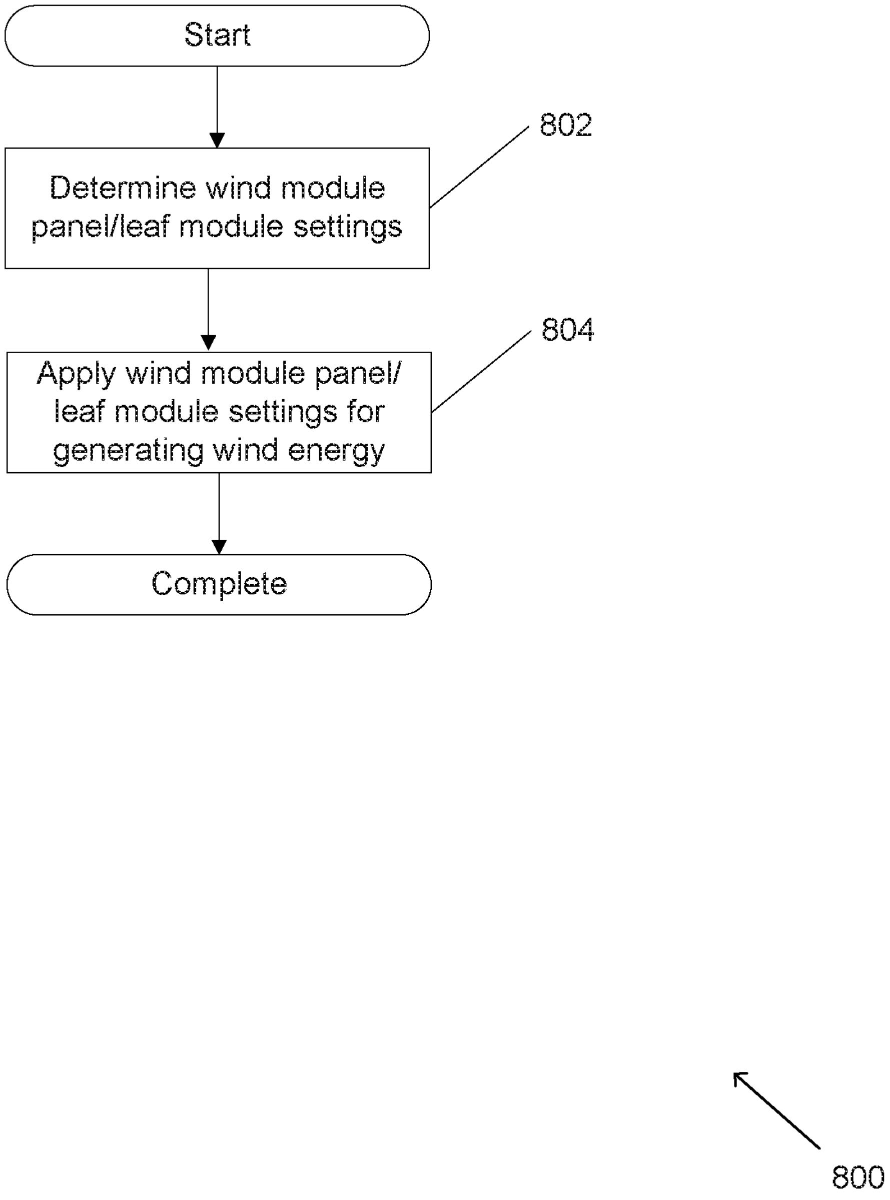
FIG. 8 is a flowchart illustrating a process for generating wind energy using wind module panel/leaf module settings in accordance with an embodiment of the invention.

A flowchart illustrating a process for generating wind energy using wind module panel/leaf module settings in accordance with an embodiment of the invention is shown in FIG. 8. The process 800 may include determining (802) wind module panel/leaf module settings, as further described below. In many embodiments, the wind module panel/leaf module settings may include settings for any component that is part of a wind module panel and/or any component of a leaf module. For example, wind module panel/leaf module settings may include leaf settings, microgenerator settings, rectifier settings, etc. In some embodiments, the leaf settings may configure the oscillator leaves to optimize the vibration of the oscillating leaves for generation of electricity. For example, in some embodiments, the leaf settings may adjust various properties of the oscillator leaf including, but not limited to, the oscillator leaf's shape, tilt, angle, etc. In some embodiments, the leaf settings may configure the oscillator leaf to fold (e.g., fold up or down) to avoid winds that may be too strong and may damage the oscillator leaf. In some embodiments, the leaf settings may also adjust various properties of the stem that is holding and/or is part of the oscillator leaf including, but not limited to, the length of the stem, rotation, tilt, angle, etc. Further, the microgenerator settings may configure the microgenerator to optimize in converting mechanical energy from the oscillator leaf to electrical energy. Moreover, the rectifier settings may configure the rectifier to optimize in converting the AC current to DC current to keep the flow moving in one direction. The process 800 may also include applying (804) the wind module panel/leaf module settings for generating wind energy. In many embodiments, applying (804) the wind module panel/leaf module settings may configure the wind module panel or any leaf module.

Figure 9:
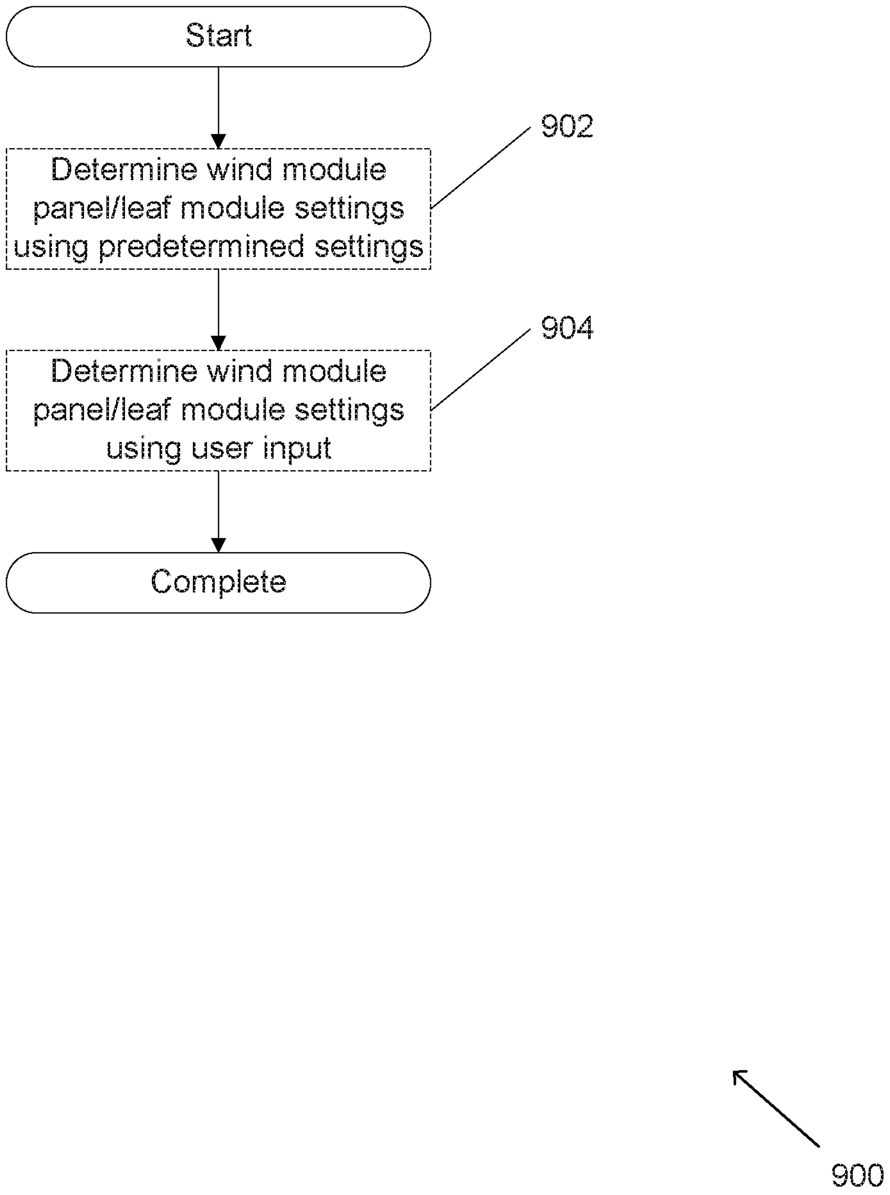
FIG. 9 is a flowchart illustrating a process for determining wind module panel/leaf module settings in accordance with an embodiment of the invention.

A flowchart illustrating a process for determining wind module panel/leaf module settings in accordance with an embodiment of the invention is shown in FIG. 9. The process 900 may include determining (902) the wind module panel/leaf module settings using predetermined settings. For example, the wind module panel and/or the leaf module may come with predetermined settings. In some embodiments, the predetermined settings may be optimized for use case, location, building type, etc. In some embodiments, the process 900 may include determining (904) the wind module panel/leaf module settings using a user input. For example, a user may provide user input data indicating the user's preferences for wind energy generation. In some embodiments, the user may utilize a user device (e.g., a smartphone, laptop, computer, etc.) to connect to the wind module panel and/or system in providing the user input.

Figure 10:
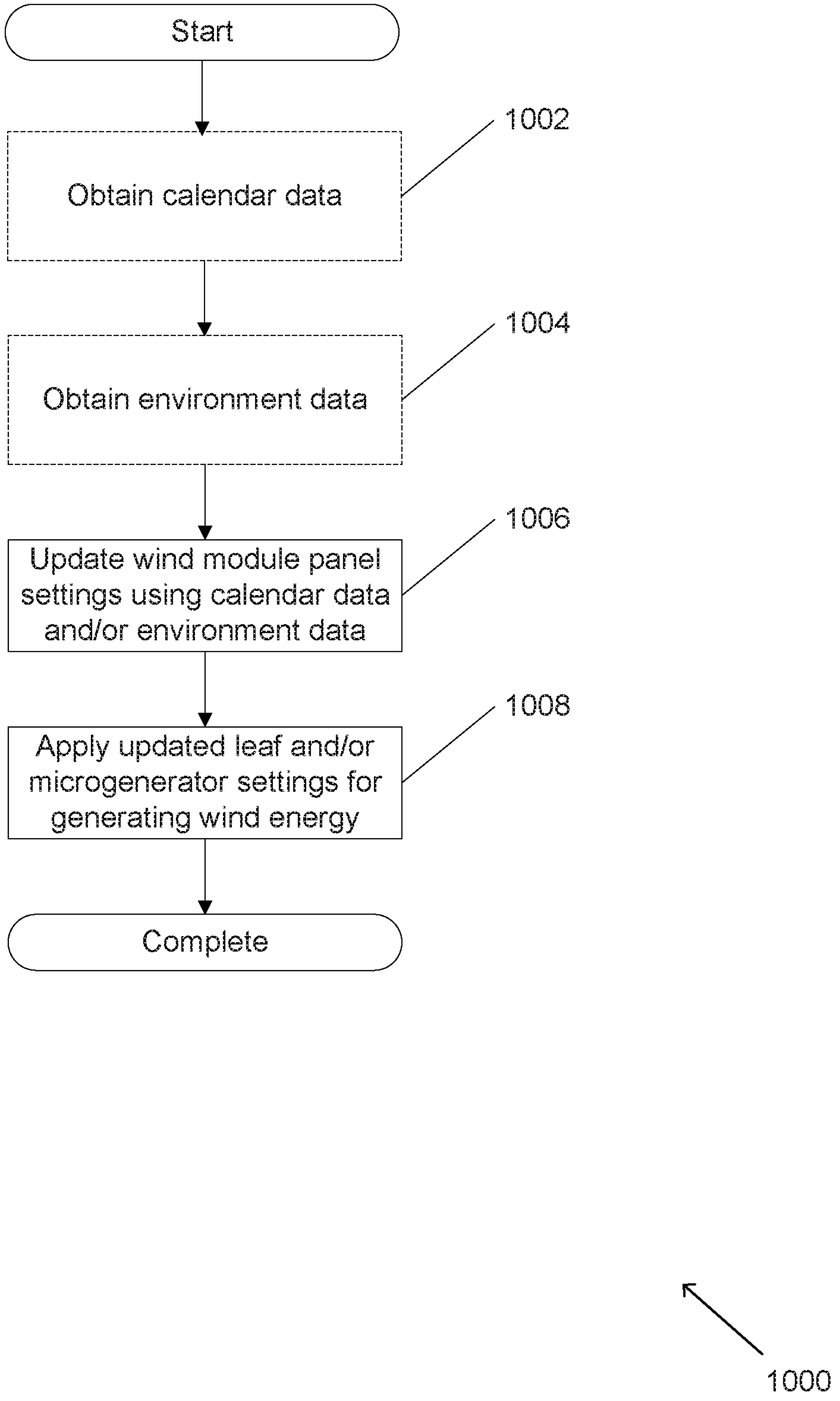
FIG. 10 is a flowchart illustrating a process for updating wind module panel/leaf module settings in accordance with an embodiment of the invention.

A flowchart illustrating a process for updating wind module panel/leaf module settings in accordance with an embodiment of the invention is shown in FIG. 10. The process 1000 may include obtaining (1002) calendar data such as, but not limited to, seasonal data and/or time data. In some embodiments, the wind module panel and/or system may obtain (1002) calendar data by connecting to the Internet via a communication module. In some embodiments, the wind module panel and/or system may be preprogramed with calendar data. In many embodiments, the seasonal data may be utilized to predict weather conditions, including, but not limited to, wind conditions. In various embodiments, time data may also be utilized to predict weather conditions, including, but not limited to, wind conditions. In some embodiments, the wind module panel and/or system may include a clock or other time keeping mechanism to generate time data. In some embodiments, the seasonal data may be dependent on the location that the wind module panel system is deployed.

In reference to FIG. 10, the process 1000 may also include obtaining (1004) environment data such as, but not limited to, wind data. In some embodiments, the various environment data may be obtained (1004) using one or more environment sensor(s). In some embodiments, the oscillator leaves may provide environment data. For example, the rate of vibration of the oscillator leaves may provide wind data. In some embodiments, the calendar and/or environment data may be utilized to increase or decrease the rate of wind energy generation. In some embodiments, the calendar and/or environment data may be utilized to determine when not to generate wind energy.

In further reference to FIG. 10, the process 1000 may also include updating (1006) the wind module panel/leaf module settings using the calendar data and/or the environment data. As described above, the wind module panel settings/leaf module may be updated (1006) to optimize wind energy generation. The process 800 may further include applying (1008) the updated wind module panel/leaf module settings for generating wind energy.

Although wind module panel processes are discussed above with respect to FIGS. 8-10, any of a variety of processes for wind energy generation using wind module panels and/or systems as appropriate to the requirements of a specific application may be utilized in accordance with embodiments of the invention. In addition, the processes described above may be implemented at various levels (e.g., system level, panel level, or leaf level) as appropriate to the requirements of a specification application. For example, in embodiments where the controls are provided for at a system level (e.g., controls at one or more system wide panels that control one or more panels), the above processes may be utilized at the system level.

Each of these non-limiting examples can stand on its own or can be combined in various permutations or combinations with one or more of the other examples. The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." In this document, the term "set" or "a set of" a particular item is used to refer to one or more than one of the particular item.

Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, RAMs, read only memories ("ROMs"), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

While processes are presented as in an order herein, alternative orders of operations may be utilized without departure from the spirit of the invention. While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A wind module panel system for generating renewable energy, the system comprising:

a first leaf module comprising:

a first leaf comprising a first blade, wherein the first blade receives wind causing the first leaf to oscillate along a first axis;

a second leaf comprising a second blade, wherein the second blade receives wind causing the second leaf to oscillate along the first axis;

a first gear rack frame comprising a first stem that receives the first leaf and a second stem that receives the second stem;

a first gear box that attaches to the first gear rack frame between the first stem and the second stem, the first gear box comprising at least one first gear and a first microgenerator, wherein the first and second leaves oscillate together along the first axis to cause the at least one first gear to rotate, wherein the rotation of the at least one first gear drives the first microgenerator to generate a first electrical current;

wherein the system further comprises an exterior sheet panel having a first slot configured to receive the first stem and a second slot configured to receive the second stem; and wherein the system further comprises a battery operatively connected to the first leaf module, wherein the battery stores the first electrical current generated by the first microgenerator.

2. The wind module panel system of claim 1, wherein the at least one first gear comprises a first gear and a second gear, wherein the first and second gears are intermeshing and having differing tooth counts.

3. The wind module panel system of claim 1, wherein the first leaf rotates about the first stem and the second leaf rotates about the second stem.

4. The wind module panel system of claim 1, wherein the first gear rack frame of the first leaf module further comprises a gear rack configured to receive the first gear box, and wherein the gear rack is positioned between the first and second stems.

5. The wind module panel system of claim 4, wherein the first gear box oscillates along the gear rack when the first and second leaves oscillate along the first axis.

6. The wind module panel system of claim 5, wherein the first and second slots are oriented along the first axis.

7. The wind module panel system of claim 5, wherein the first leaf module further comprises a first spring that is connected to the first gear rack frame between the first gear box and the first stem, wherein the first spring compresses or extends during the oscillation of the first gear box along the gear rack.

8. The wind module panel system of claim 7, wherein the first leaf module further comprises a second spring that is connected to the first gear rack frame between the first gear box and the second stem, wherein the second spring compresses or extends during the oscillation of the first gear box along the gear rack.

9. The wind module panel system of claim 1 further comprising a second leaf module operatively connected to the battery, wherein the second leaf module comprises:

a third leaf comprising a third blade, wherein the third blade receives wind causing the third leaf to oscillate along the first axis;

a fourth leaf comprising a fourth blade, wherein the fourth blade receives wind causing the fourth leaf to oscillate along the first axis;

a second gear rack frame comprising a third stem that receives the third leaf and a fourth stem that receives the fourth leaf; and a second gear box that attaches to the second gear rack frame between the third stem and the fourth stem, the second gear box comprising at least one second gear and a second microgenerator, wherein the third and fourth leaves oscillate together along the first axis to cause the at least one second gear to rotate, wherein the rotation of the at least one second gear drives the second microgenerator to generate a second electrical current; and wherein the exterior sheet panel further comprises a third slot configured to receive the third stem and a fourth slot configured to receive the fourth stem.

10. The wind module panel system of claim 9 further comprising a control panel comprising:

a hardware processor operatively connected to the first leaf module and to the second leaf module; and memory storing a program comprising instructions that, when executed by the processor, cause the system to store, in the battery, the first electrical current generated by the first microgenerator of the first leaf module and the second electrical current generated by the second microgenerator of the second leaf module.

11. The wind module panel system of claim 10 further comprising a rectifier, and wherein the program comprises further instructions that, when executed by the hardware processor, further cause the system, using the rectifier, to convert alternating current (AC) into direct current (DC) when storing the first and second electrical currents in the battery.

12. The wind module panel system of claim 11 further comprising a DC to DC converter.

13. The wind module panel system of claim 11 further comprising an inverter, and wherein the program comprises further instructions that, when executed by the hardware processor, further cause the system, using the inverter, to convert DC energy stored in the battery into AC energy.

14. The wind module panel system of claim 13 further comprising at least one sensor, and wherein the program comprises further instructions that, when executed by the hardware processor, further cause the system to obtain wind data using the at least one sensor.

* * * * *